United States Patent
Yoshizawa

(10) Patent No.: US 8,892,111 B2
(45) Date of Patent: Nov. 18, 2014

(54) METHOD AND SYSTEM FOR PERFORMING SERVICE ADMISSION CONTROL

(75) Inventor: Takahito Yoshizawa, Boom (BE)

(73) Assignee: Thomson Licensing, Issy-les-Moulineaux (FR)

( * ) Notice: Subject to any disclaimer, the term of this patent is extended or adjusted under 35 U.S.C. 154(b) by 642 days.

(21) Appl. No.: 12/316,624

(22) Filed: Dec. 15, 2008

(65) Prior Publication Data

US 2009/0170524 A1 Jul. 2, 2009

(30) Foreign Application Priority Data

Dec. 27, 2007 (EP) .................................. 07447072

(51) Int. Cl.
  *H04W 72/00* (2009.01)
  *H04W 28/16* (2009.01)
  *H04W 28/26* (2009.01)
  *H04W 84/04* (2009.01)

(52) U.S. Cl.
  CPC .............. *H04W 28/16* (2013.01); *H04W 28/26* (2013.01); *H04W 84/045* (2013.01)
  USPC ........ 455/452.2; 455/453; 455/507; 455/509; 455/512; 370/395.1; 370/395.41; 370/468

(58) Field of Classification Search
  USPC .............. 455/453, 507, 509, 512, 527, 166.2, 455/452.2, 266
  See application file for complete search history.

(56) References Cited

U.S. PATENT DOCUMENTS

| | | | |
|---|---|---|---|
| 7,006,472 B1 * | 2/2006 | Immonen et al. ............. | 370/332 |
| 7,392,050 B2 * | 6/2008 | Svensson et al. ........... | 455/435.3 |
| 7,561,883 B2 * | 7/2009 | Codaccioni et al. .......... | 455/453 |
| 7,640,020 B2 * | 12/2009 | Gutowski .................... | 455/452.2 |
| 2003/0165122 A1 * | 9/2003 | Westphal ...................... | 370/329 |
| 2003/0189915 A1 * | 10/2003 | Miller .......................... | 370/343 |

(Continued)

FOREIGN PATENT DOCUMENTS

| | | | | |
|---|---|---|---|---|
| WO | WO97/31495 | | 8/1997 | |
| WO | WO 97/31495 | * | 8/1997 | ............... H04Q 7/24 |
| WO | WO 9731495 A1 | * | 8/1997 | ............... H04Q 7/24 |

OTHER PUBLICATIONS

Lester T. W. Ho et al., "Effects of User-Deployed, Co-Channel Femtocells on Call Drop Probability in a Residential Scenario" Personal, Indoor and Mobile Radio Communications, 2007, PIMRC 2007 IEEE 18th International Symposium on, IEEE, PI Sep. 1, 2007, pp. 1-5, XP031168359.

(Continued)

*Primary Examiner* — Mehmood B Khan
(74) *Attorney, Agent, or Firm* — Myers Wolin LLC

(57) ABSTRACT

The invention concerns a method at a base station device for performing service admission control, the base station device comprising an interface to a cellular network, and an interface to connect to a broadband device, the base station device being adapted to provide service access to devices of the cellular network, the service being provided through the broadband network.

To this end the method comprises the steps of receiving a service admission request from a device of the cellular network, sending a resource reservation request to the broadband device for enabling said service on the broadband network, receiving a resource reservation response from the broadband device and responding to the device of the cellular network on the availability of the service, the availability depending on the service admission response received from the broadband device.

7 Claims, 4 Drawing Sheets

(56) References Cited

U.S. PATENT DOCUMENTS

| | | |
|---|---|---|
| 2005/0101245 A1* | 5/2005 | Ahmavaara ................. 455/1 |
| 2005/0135289 A1* | 6/2005 | Han et al. .................. 370/311 |
| 2006/0040663 A1* | 2/2006 | Ise et al. ................... 455/434 |
| 2006/0104297 A1 | 5/2006 | Buyukkoc et al. |
| 2007/0286177 A1 | 12/2007 | Yamada |
| 2008/0031326 A1* | 2/2008 | Lecomte et al. ......... 375/240.12 |
| 2008/0117836 A1* | 5/2008 | Savoor et al. ............. 370/254 |
| 2008/0117869 A1* | 5/2008 | Freen et al. ............... 370/329 |
| 2009/0285218 A1* | 11/2009 | Adamczyk et al. ...... 370/395.21 |

OTHER PUBLICATIONS

Search Report dated Jul. 7, 2008.

* cited by examiner

METHOD AND SYSTEM FOR PERFORMING SERVICE ADMISSION CONTROL

This application claims the benefit, under 35 U.S.C. §119 of EP Patent Application 07447072.5 filed 27 Dec. 2007.

FIELD OF THE INVENTION

The present invention relates generally to residential gateways and in particular to a method and device for resources allocation and admission control.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A femtocell is a cellular base station that is functionally similar to a macrocell cellular base station, noted a macrocell hereinafter. A femtocell is also called an access point base station. It is adapted to connect cellular handsets to a cellular network. The area covered by a base station is called a cell. When a cellular handset is located in a cell, it can connect to a base station. A femtocell is adapted to cover a much lower cell range than a macrocell. A typical use of a femtocell is inside a building to cover areas that are not reached by a macrocell. A femtocell may also be used in a home network to provide access to the core network through the broadband network. Coupled to a home gateway, the femtocell permits cellular devices connection to the core network through the gateway instead of connecting through the macrocell. The broadband link capacity is dependent on the physical characteristics of the link and it varies per home network installation. The available link capacity may not be sufficient at the broadband to enable all traffic from the femtocell.

The present invention attempts to remedy at least some of the concerns connected with the available link capacity, by providing an admission control mechanism.

SUMMARY OF THE INVENTION

The invention concerns a method at a base station device for performing service admission control, the base station device comprising an interface to a cellular network, and an interface to connect to a broadband device, the broadband device comprising an interface to a broadband network and the base station device being adapted to provide service access to devices of the cellular network, the service being provided through the broadband network.

To this end the method comprises the steps of receiving a service admission request from a device of the cellular network, sending a resource reservation request to the broadband device for enabling said service on the broadband network, receiving a resource reservation response from the broadband device and responding to the device of the cellular network on the availability of the service, the availability depending on the service admission response received from the broadband device.

The resources availability on the broadband network, at the broadband device interface, is not visible to the cellular device. The base station device then requests the broadband device on the availability of the resource. Depending on the availability of the resource for the service, it is reserved or not to the base station device and further granted or no to the cellular device.

According to an embodiment, the method comprises the steps of, on interruption of a service on a device on the cellular network, indicating the interruption to the broadband device.

The base station device indicates to the broadband device when a service on a device of the cellular network is terminated. This permits the broadband device to be aware that the resource reserved for that service is now available on the broadband.

According to an embodiment, the base station device is a femtocell.

According to an embodiment, the base station device is comprised in the broadband device.

The invention concerns also a method at a broadband device for performing service admission control, the broadband device comprising an interface to a broadband network, and an interface to connect to a base station device, the base station device comprising an interface to a cellular network. The method comprises the steps of receiving a resource reservation request from the base station device for enabling a service on the broadband network, the service being requested by a device of the cellular network and sending a resource reservation response to the base station device, the response indicating availability of the resource on the broadband network.

According to an embodiment, it the resource is available on the broadband network, the service is granted, and if the resource is not available on the broadband network, the service is not granted.

According to an embodiment, the resource reservation request comprises an indication of the priority level of the service, and if the resource is not available on the broadband network, the broadband device aborts a service having a lower priority that is already granted and grants the requested service.

Services are ranked with priorities. The broadband device grants services according to their priority level. When a service with low priority has been granted, and that a service with higher priority is requested later on, the service with low priority is cancelled in order to grant the high priority service.

According to an embodiment, the method comprises the step of indicating the broadband link state to the base station device.

According to an embodiment, the broadband device is connected to more than one base station device where each base station device has a priority level, and that the admission response depends on the base station device priority.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 1 to 4, the represented blocks are purely functional entities, which do not necessarily correspond to physically separate entities. Namely, they could be developed in the form of software, hardware, or be implemented in one or several integrated circuits.

DETAILED DESCRIPTION OF PREFERRED EMBODIMENTS

The exemplary embodiment of the invention comes within the framework of a service admission control performed at a femtocell and at a gateway. Of course the invention is not limited to this particular environment and may be applied within other frameworks where admission control is shared between two devices.

Figure 1:
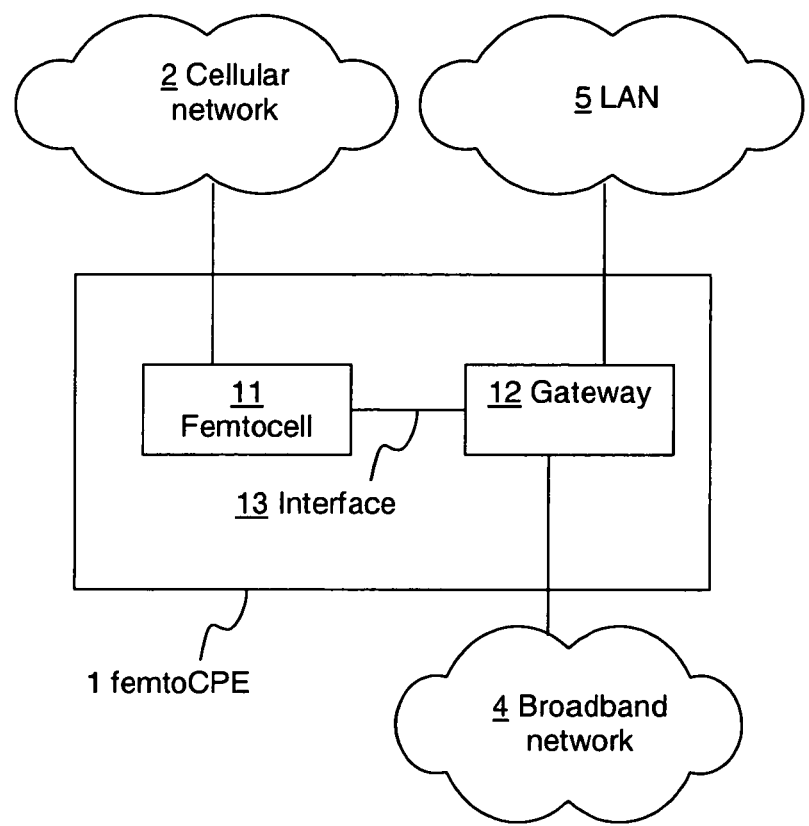
FIG. 1 is a block diagram of a system according to the first embodiment.

The system according to the first embodiment is illustrated in FIG. 1. The system comprises customer premise equipment, femtoCPE 1. The femtoCPE 1 comprises a gateway element 12 and a femtocell element 11. The femtocell element is connected to a cellular network 2. The FemtoCPE is a fully integrated CPE that contains both femtocell hardware and software functionalities and the gateway functionalities. The cellular network is a radio network that conforms to the Universal Mobile Telecommunications System (UMTS) set of standards. Of course it could be any type of cellular network type.

There are dedicated physical components that are specific to the femtocell operation, such as lower-layer radio processing and likely a separate processing unit for higher-layer processing such as UMTS protocol stack termination. In this respect, there are still physical and logical boundaries even in the integrated product. The femtocell element refers to the portion of the integrated FemtoCPE that is responsible for the femtocell functionalities. The gateway element comprises all the other functionalities of the integrated FemtoCPE, i.e. equivalent to the existing gateway product functionalities.

The gateway 12 is connected to the home network, the LAN 5, and to the broadband network 4. In the embodiment, the gateway comprises a DSL modem to connect to the broadband. It is called a DSL gateway and ALSO noted DSL GW hereinafter. Of course it could also be any other type of broadband connection, such as a cable modem, fiber optics or satellite modem. The LAN is an Ethernet network. Of course the first embodiment is not limited to an Ethernet interface, and could be any other type of communication interface that permits to connect the femtocell element to the gateway.

The femtocell element is connected in a point to point manner to the DSL GW. In particular, the femtocell is connected via an Ethernet interface 13.

Figure 3:
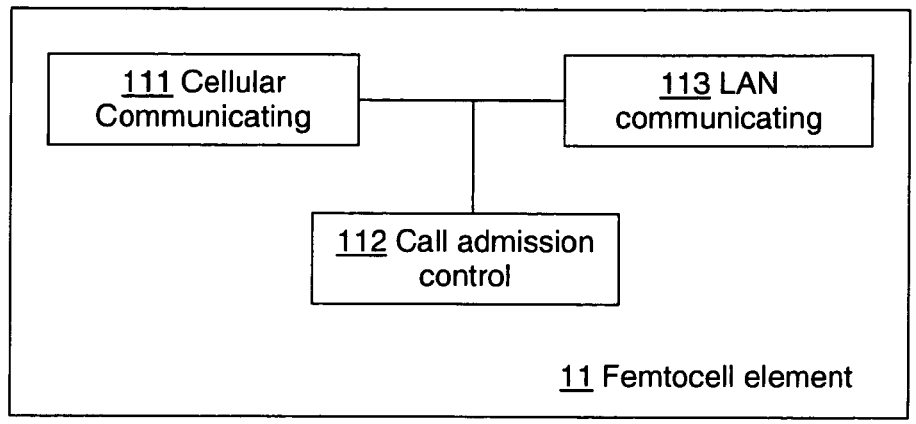
FIG. 3 is block diagram of a Femtocell element according to the embodiments.
Figure 4:
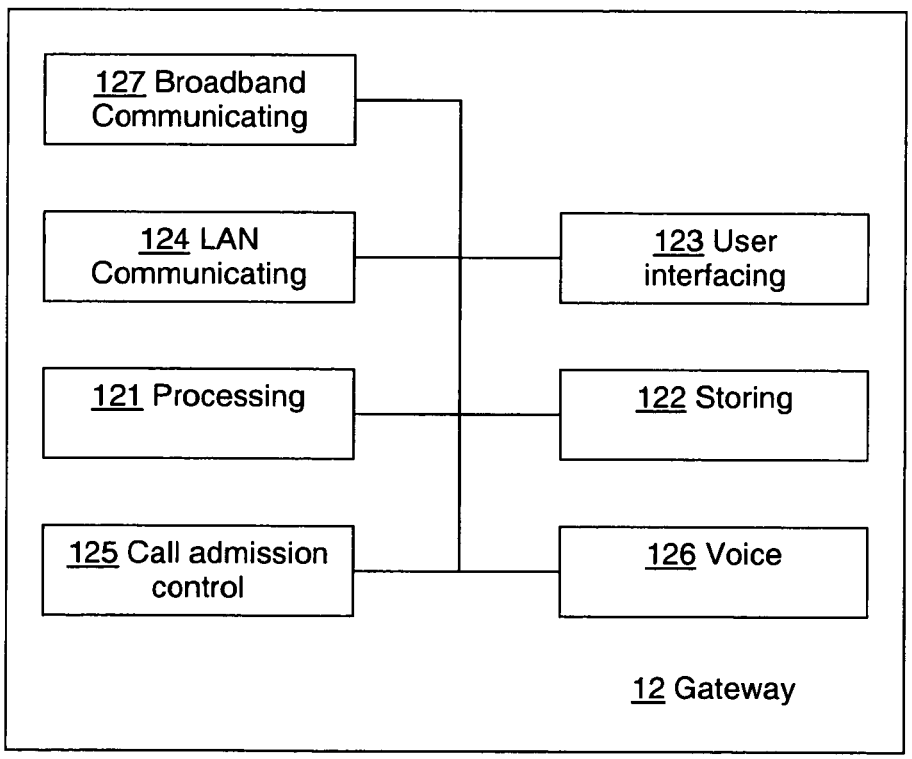
FIG. 4 is block diagram of a gateway according to the embodiments.

The DSL GW element 12 and the femtocell element 11 are further represented in FIGS. 3 and 4.

The femtocell element comprises a cellular communicating module 111, which comprises lower-layer radio processing and higher-layer processing, and in particular the UMTS interface. It is adapted to connect UMTS compatible user equipments, noted UE hereinafter. It comprises a LAN communicating module 113 that comprises the LAN interface, and in particular the Ethernet interface. It also comprises a call admission control module 112, noted CAC module. It is adapted to manage the CAC policy at the femtocell; and is further described hereinafter.

The DSL GW element comprises a broadband communicating module 127 which is adapted to interface to the WAN and a LAN communicating module 124 adapted to communicate to the LAN, in particular an Ethernet interface and a DSL interface. It comprises a voice module 126 to enable the connection of at least a voice terminal to the gateway. The voice interface is a foreign exchange station, FXS. Of course it could be any other type of phone interface. The gateway comprises a user interface 123 to enable an end user to interface to the CPE. It comprises a call admission control module 125 to manage the call admission at the CPE. In particular the call admission control manages the call admission at the femtocell and at the gateway, as described hereinafter. The gateway also comprises a storing module 122, called a capacity pool, that is adapted to maintain the total bandwidth available at the DSL link, and among that the capacity available for the voice traffic.

The behavior of the femtocell element is driven by information that is available at the gateway. That information is the DSL link speed. It is not visible at the femtocell. It is communicated by the gateway to the femtocell, using a communication mechanism as described in the embodiment.

From the gateway, the femtocell is considered as being a LAN device connected to the Ethernet interfaces behind the gateway. In order to uniquely detect and identify a femtocell on the LAN, the gateway uses the DHCP option 60, the vendor class identifier. This option is used by DHCP clients to identify the vendor type and configuration of a DHCP client. This is defined in IETF RFC 2132, DHCP Options and BOOTP Vendor Extensions.

The femtocell and the gateway might be connected in a femtoCPE through another point to point interface that does not require detection and identification processes. The interface is set up with factory default parameters; the gateway and the femtocell identify each others when assembled in a factory at the femtoCPE.

An internal communication protocol between the gateway and the femtocell is defined. The communication is needed to manage the femtocell from the gateway in a coherent manner. Some of the usage of this mechanism is to communicate the DSL gateway specific information that is useful to drive the behavior in the femtocell, and vice versa. Another usage is for the DSL gateway to collect information local to the femtocell for management purpose. There are four types of communication model between the DSL GW and the femtocell. First, the DSL GW sends notification message to the femtocell. Second, the femtocell sends notification message to the DSL GW. Third, the femtocell sends a request to which the DSL GW responds with appropriate information. Finally the DSL GW sends a request to which the femtocell responds with appropriate information.

According to the first embodiment, the internal communication notification is transported over a TCP/IP packet. The fields are indicated in the table below. The Femto internal communication message field is part of the TCP/IP header. Of course the Femto internal communication message might be transported by any other type of packet that can be exchanged in a LAN between the femtocell and the gateway.

| Protocol | Field | Bits | Value field |
|---|---|---|---|
| IP | Src IP addr | 32 | Local private IP address of DSL GW or femtocell element |
| | Dest IP addr | 32 | Local private IP address of DSL GW or femtocell element |
| TCP | Src port | 16 | 49150 (upper-end of unused registered port range) |
| | Dest port | 16 | 49150 (ditto) |
| | Length | 16 | Variable (TCP header + Femto internal comm.. field) |
| | Checksum | 16 | Checksum |
| Femto internal comm.. | Version | 2 | '01' |
| | Reserved | 6 | '000000' |
| | Msg type | 8 | See table below. |
| | Length | 16 | Length including header and the payload |
| | Payload | variable | See the following sections below. |

The message types of the femto internal communication message are indicated in the table below:

| Msg type | Definition |
|---|---|
| 01 | DSL link state change notification (link up) |
| 02 | DSL link state change notification (link down) |
| 03 | DSL link capacity query |
| 04 | DSL link capacity response |
| 11 | Capacity allocation request |
| 12 | Capacity de-allocation request |
| 13 | Capacity allocation/de-allocation response |
| 21 | Reset/reboot, Factory default reset notification |
| 31 | UE status query |
| 32 | UE status response |

DSL Link State Change Notification message is sent from the DSL GW to the femtocell element in order to alert that the DSL link has gone down and thus not available for service. It is also sent to indicate that the DSL link is up together with the current upstream/downstream DSL link capacity.

DSL Link Capacity Query message is sent from the femtocell element to the DSL GW element in order to request the actual available DSL link capacity from the DSL GW.

DSL Link Capacity Response message is sent from the DSL GW to the femtocell element in order to convey the actual available DSL link capacity in response to the DSL link capacity query message.

Capacity Allocation Request message is sent from femtocell element to the DSL GW element. Whenever a new call (voice or data) is started, the femtocell element requests the DSL GW element whether there is sufficient capacity in the DSL link available or not. If sufficient link capacity is available, the DSL GW responds with a positive acknowledgement. When the femtocell element receives a positive response, it can proceed with the call set up. If insufficient link capacity is available, the DSL GW may send a negative response, to indicate that there is not sufficient amount of capacity available, and thus the call request is rejected. The DSL GW may also release bandwidth by discarding lower priority traffic. The femtocell then receives a positive response. The overall intent of this message exchange is to ensure that appropriate level of QoS is maintained at the CPE level while not exceeding the available DSL link capacity (especially in the uplink direction). The main goal is to keep the voice traffic on either element to be maintained with good QoS level regardless of the presence or absence of other type of traffic (e.g. 3G data session on femtocell element and LAN traffic on PC, etc.). This may involve throttling down other non-delay-sensitive traffic such as data traffic on ether side.

The voice traffic may be either circuit switching service, CS service, or packet switching service, PS service. A typical CS service is voice, and a typical PS service is data. The DSL GW terminates the xDSL line to the DSLAM. It knows the currently available xDSL link capacity. It is defined in TR-069 parameters; TR-069 being the DSL Forum Technical Report on CPE WAN management protocol.

Capacity De-allocation Request message is sent from femtocell element to the DSL GW element. It is sent whenever an existing call ends. The DSL GW element that maintains the DSL link capacity takes the event into consideration and makes the capacity available for other calls in the future.

Capacity Allocation/De-allocation Response message is sent from DSL GW element to the femtocell element as a response to Capacity Allocation Request and Capacity De-allocation Request message.

Reset/reboot, Factory Default Reset message is sent from the DSL GW to the femtocell element to notify that the DSL GW has received a command to take such action, either from the local CLI/GUI or remotely via TR-069. The intent is to communicate to the femtocell element that the DSL GW will go through a reset and thus service interruption will occur. It is also sent to trigger the femtocell element to take appropriate action. In the case of factory default reset, the DSL GW's configuration will revert to the factory default.

UE status query message is sent from the DSL GW to the femtocell element in order to gather femtocell specific information. UE status response message is sent from the femtocell element as a response to the query, containing the femtocell specific information.

UE status response message is sent from the femtocell element as a response to the query, containing the femtocell specific information. The International Mobile Subscriber Identity length, IMSI length, is optional. The IMSI-x is optional as well. Zero or more of this information element can be repeated. In case there is no UE currently camping on to the femtocell, then there is no field present in the message.

The communication messages are summarized in the table below.

| Message Type | Timing/triggering event for sending the message | Resulting Action by the receiving side |
|---|---|---|
| DSL link state change notification | When the DSL GW detects that the DSL link state changed (up->down, down->up) | When link up condition is detected, the femtocell element triggers DSL link capacity query to the DSL GW element. When link down condition is detected, the femtocell element: 1) will turn off the RF, 2) in case there is at least one voice call ongoing at the femtocell element, the call is dropped, 3) in case there is at least one data session ongoing at the femtocell element, the session may go into dormant state. |
| DSL link capacity query | 1. At initial boot up 2. On-demand (e.g. at call set up time) 3. Periodically | The DSL GW element responds with the current DSL link capacity. |
| DSL link capacity response | When DSL link capacity query is received. | The femtocell element: 1) is allowed to turn on the RF if currently not on (provided that all other conditions are met), and 2) derives its CAC policy based on the currently available DSL link capacity. |

| Message Type | Timing/ triggering event for sending the message | Resulting Action by the receiving side |
|---|---|---|
| Capacity allocation request | When the femtocell accepts a new call | The DSL GW: 1) calculates the available DSL link capacity based on the aggregate call load of all existing calls, 2) determines whether to grant or deny the request from the femtocell, and 3) responds to the request back to the femtocell element. |
| Capacity de-allocation request | When the femtocell takes down an existing call | The DSL GW de-allocates the link capacity associated with the call to make it available for future call requests. |
| Capacity allocation/ de-allocation response | When Capacity allocation request is received from the femtocell element | The femtocell element: 1) proceeds with the call set up when the positive response is received, or 2) aborts the call set up when the negative response is received. |
| Reset/ reboot | 1. Reset is triggered by user via local CLI/GUI. 2. Reset is triggered by network operator remotely via TR-069 | The DSL GW to reset/reboot. The femtocell element executes appropriate reset action (warm/cold reset). |
| Factory default | 1. A button on the box is pressed by the user. 2. Triggered by user via local CLI/GUI. 3Triggered by network operator remotely via TR-069 | The DSL GW to revert to factory default configuration. The femtocell element executes appropriate reset action (warm/cold reset). |
| UE status query | 1. Query is made at the local CLI/ GUI. 2. Periodically | Femtocell element responds with the appropriate information relevant to the femtocell. |
| UE status response | When status query is received from the DSL GW | DSL GW to store the information contained in the response from the femtocell element. |

The DSL GW element manages and maintains the aggregate capacity at the CPE level. The amount of capacity removed and returned to the capacity pool is dependent on the type of call.

The DSL GW and the femtocell elements form a client-server relationship to manage the Call Processing resource. The DSL GW is the master and the femtocell is the client. A single point within the CPE oversees the overall traffic level at the CPE level collectively. This ensures that the aggregate traffic stays within the DSL link capacity. The quality of service is handled appropriately so that voice call is given higher priority over the data call, regardless of the call is a 3G CSP/PS service on the femtocell or via the FXS port on the DSL GW.

Figure 5:
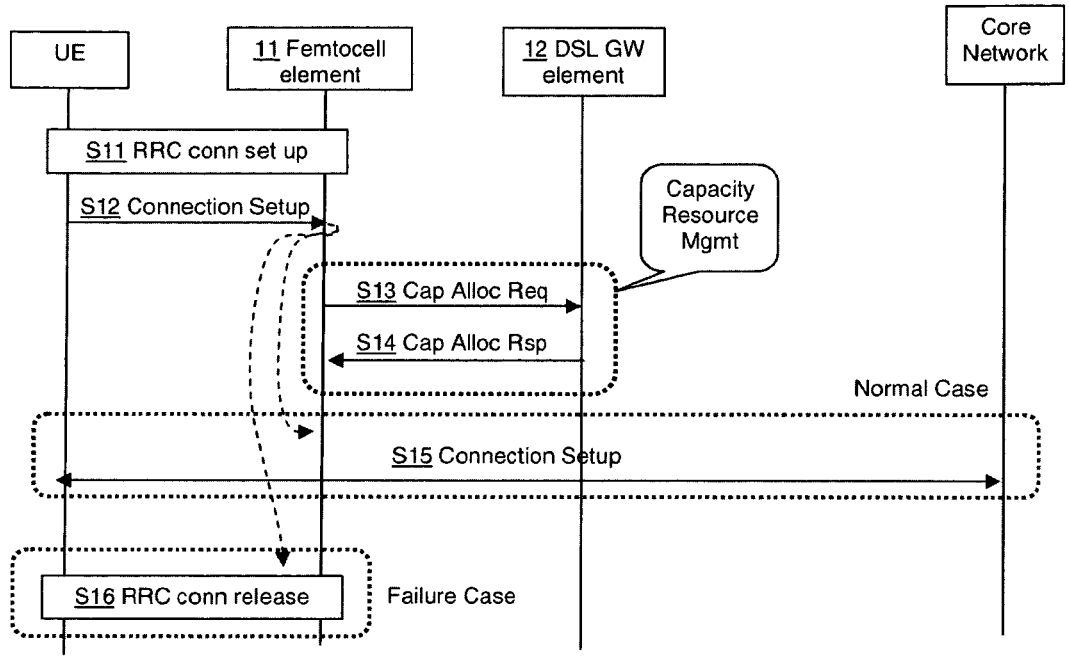
FIG. 5 is flow chart of representing the connection setup according to the embodiments.
Figure 6:
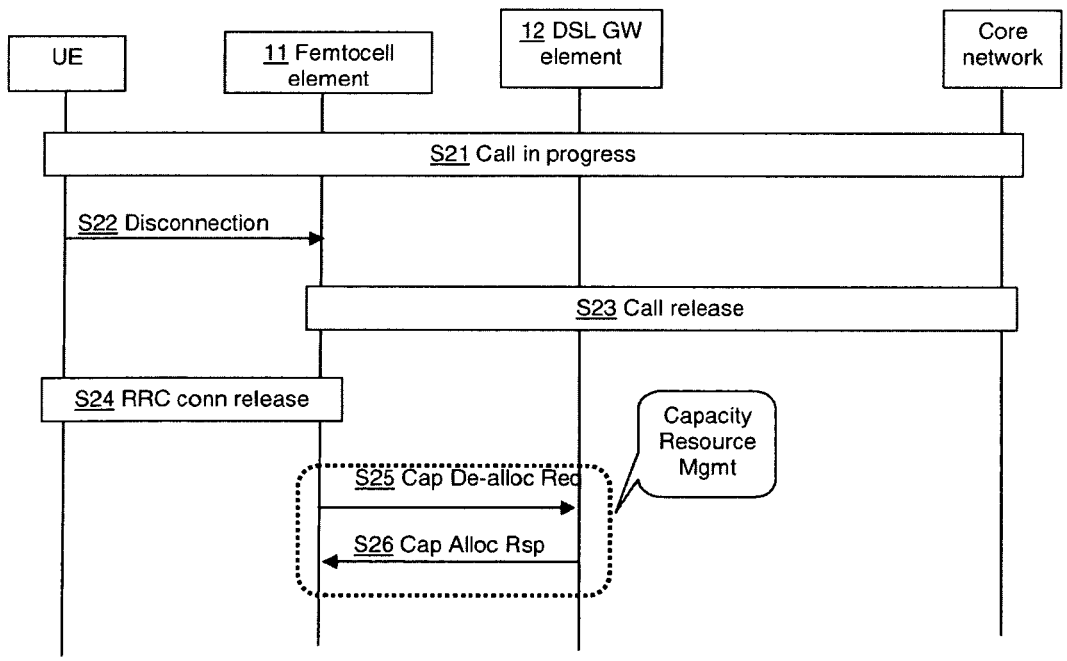
FIG. 6 is flow chart of representing the connection release according to the embodiments.

The method is further illustrated in FIGS. 5 and 6. The exact timing of the resource management message exchange within the UMTS call control sequence is implementation dependent and outside the scope of this document.

Whenever a new call, either a CS/PS or voice/data, is requested, step S11 and S12, origination or termination, the femtocell element requests a capacity to the DSL GW S13. The DSL GW takes the existing aggregate traffic load and the new request into consideration and determines whether to grant or deny the new call request by the femtocell element, S14.

When the capacity requested is granted, the femtocell can proceed with the pending call sequence, S15. When it is denied, the femtocell needs to abort the pending call sequence, S16. This resource request/response is tied to the UMTS call establishment in the beginning of the call set up sequence. The UMTS call establishment uses the UMTS Radio Access Network Application Part protocol.

A call is in process, S21. The femtocell receives a request for disconnecting S22. The call is torn down, S23 and S24. The femtocell element requests to release the capacity to the DSL GW element, S25. The DSL GW puts the corresponding capacity back to the capacity pool so that it is available for future calls, S26.

The internal communication messages indicated above are of course not limitative. They could be extended, combined or modified.

Figure 2:
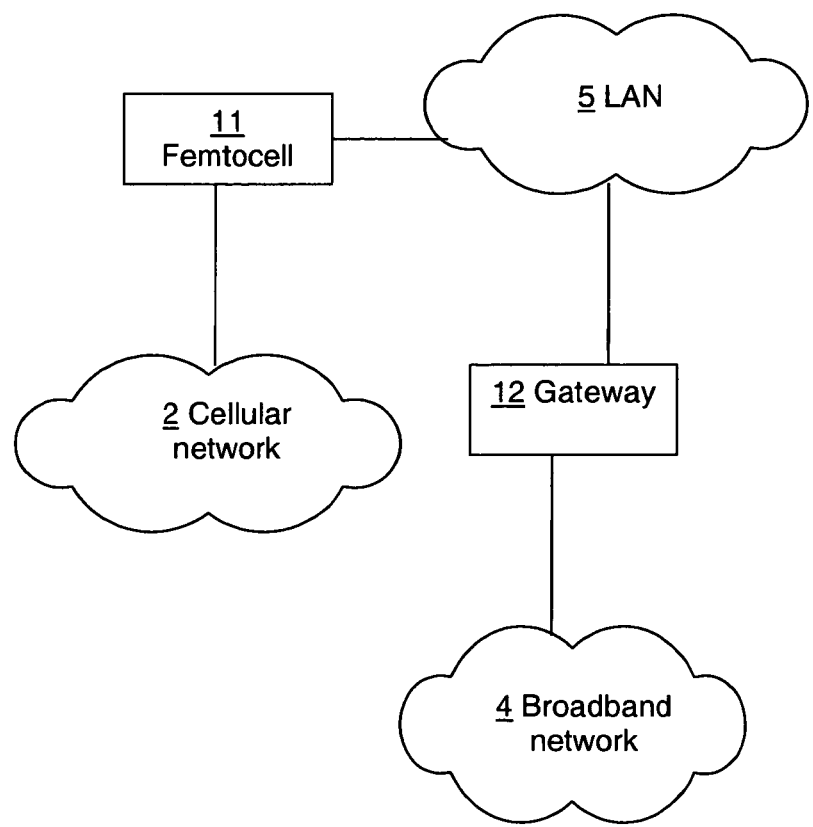
FIG. 2 is a block diagram of a system according to the second embodiment.

According to a second embodiment, the femtocell and the gateway are not located at the same device. This is represented in FIG. 2. The femtocell 11 is connected to the LAN 5. It is connected to the gateway via an Ethernet interface. The features indicated in the first embodiment for femtocell detection, communication interface, also apply to the second embodiment.

The embodiments come within the framework of a femtocell connected to a gateway. Of course the invention is not limited to one femtocell and one gateway. It is applicable to more than one femtocells connected to a gateway. It is also applicable to a femtocell connected to more than one gateway.

With more than one femtocell connected to the gateway, the admission control is shared between the gateway and the femtocells. Priorities may be set among femtocells, and among traffic over femtocells.

With a femtocell connected to more than one gateway, the femtocell selects the gateway according to the broadband link state. It sends the capacity request to the more promising gateway.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method at a base station device for performing service admission control, said base station device being adapted to provide a service access to devices of a cellular network, said service being provided through a broadband network, wherein the method comprises:
   connecting to said cellular network by the base station via a first interface;
   receiving, by said base station device, an admission request emitted by a device of the cellular network, said admission request identifying a requested service and comprising an indication of a priority level of the requested service;
   connecting to a broadband device by the base station via a second interface, the broadband device being configured to grant services according to a priority level so that, when a service with low priority has been granted and a service with higher priority is requested later on, the service with low priority is cancelled in order to grant the high priority service in case the resource is not able to support both the service with low priority and the service with high priority;

sending a broadband link capacity request emitted by said base station device, to the broadband device for verifying a link capacity is available on a connection between the broadband device and the broadband network for said service;

connecting to the broadband network by said broadband device via a third interface;

receiving, by said base station device, from the broadband device in response to the broadband link capacity request, a link capacity response conveying the link capacity available on the connection between the broadband device and the broadband network;

sending a capacity allocation request by said base station device to request from the broadband device whether there is capacity available on the connection between the broadband device and the broadband network;

when the link capacity is available, granting the capacity allocation request by the broadband device by taking into account the priority level of the requested service;

when the link capacity is not available, denying the capacity allocation request by the broadband device by taking into account the priority level of the requested service;

determining, by said base station device, whether to grant or deny admission to the requested service based on the capacity allocation response of said broadband device; and sending, in response to the admission request, a service admission response emitted by said base station device, to the device of the cellular network.

2. The method of claim 1, further comprising on interruption of a service on a device on the cellular network, indicating, by said base station device, said interruption to the broadband device.

3. The method according to claim 1, wherein the base station device is a femtocell.

4. The method according to claim 1, wherein the base station device is comprised in the broadband device.

5. A method at a broadband device for performing service admission control, wherein the method comprises:

connecting to a broadband network by the broadband device via a first interface, the broadband device being configured to grant services according to a priority level so that, when a service with low priority has been granted and a service with higher priority is requested later on, cancelling the service with low priority and granting the service with high priority in case a resource is not able to support both the service with low priority and the service with high priority;

connecting to a base station by said broadband device via a second interface;

connecting to a cellular network by said base station via a third interface;

receiving, by said broadband device, a broadband link capacity request emitted by said base station device for verifying that link capacity is available on a connection between the broadband device and the broadband network for the service associated with the priority level, said service being requested by a device of the cellular network;

aborting the service with the low priority already granted for the service with high priority, in case the resource for the requested service is not available on the broadband network; and sending a link capacity response emitted by said broadband device, to said base station device, said response conveying the link capacity available on the connection between the broadband device and the broadband network, receiving a capacity allocation request from said base station device to request to the broadband device whether there is capacity available or not available on the connection between the broadband device and the broadband network:

when the link capacity is available, granting the capacity allocation request by the broadband device by taking into account the priority level of the requested service;

when the link capacity is not available denying the capacity allocation request by the broadband device by taking into account the priority level of the requested service;

wherein said base station device determines whether to grant or deny admission to the requested service based on said capacity allocation response of the broadband device;

when said resource is available on the broadband network, granting the service based on the capacity allocation response of the broadband device; and when said resource is not available on the broadband network, deny granting the service.

6. The method according to claim 5, further comprises indicating, by said broadband device, the broadband link state to said base station device.

7. The method according to claim 5, wherein the broadband device is connected to more than one base station device where each base station device has a priority level, and that said admission response depends on the base station device priority.

* * * * *